United States Patent [19]
Homier et al.

[11] Patent Number: 5,967,546
[45] Date of Patent: Oct. 19, 1999

[54] SIDE AIR BAG DIRECTIONAL GUIDE SYSTEM

[75] Inventors: Robert I. Homier, Plymouth; Carl J. Holdampf, Farmington Hills, both of Mich.

[73] Assignee: Magna Lomason Corporation, Farmington Hills, Mich.

[21] Appl. No.: 08/833,416

[22] Filed: Apr. 4, 1997

Related U.S. Application Data

[63] Continuation-in-part of application No. 08/745,743, Nov. 12, 1996.

[51] Int. Cl.⁶ .................................................. B60R 21/22
[52] U.S. Cl. ...................................... 280/730.2; 280/743.1
[58] Field of Search .............................. 280/730.2, 743.1

[56] References Cited

U.S. PATENT DOCUMENTS 5,498,030  3/1996  Hill et al. ............................. 280/730.2
5,678,853  10/1997  Maly ..................................... 280/730.2

FOREIGN PATENT DOCUMENTS

| 768 215 | 4/1997 | European Pat. Off. . |
| 788 940 | 8/1997 | European Pat. Off. . |
| 2 293 355 | 3/1996 | United Kingdom . |
| 2 296 476 | 7/1996 | United Kingdom . |

*Primary Examiner*—Kenneth R. Rice
*Attorney, Agent, or Firm*—Pillsbury Madison & Sutro LLP

[57] ABSTRACT

The side air bag directional guide system is provided for intensifying the forces applied to a seam in a vehicle seat for allowing the air bag to be deployed through an opening in the seam. The air bag directional guide system includes a vehicle seat including a seat back having a seat cover. An air bag unit is mounted inside of the seat cover and a membrane is wrapped around the air bag unit and has first and second ends connected to a seam in the seat cover. Upon deployment of the air bag, the membrane intensifies the forces applied to the seam thereby tearing open the seam to provide an opening through which the air bag is deployed.

9 Claims, 6 Drawing Sheets

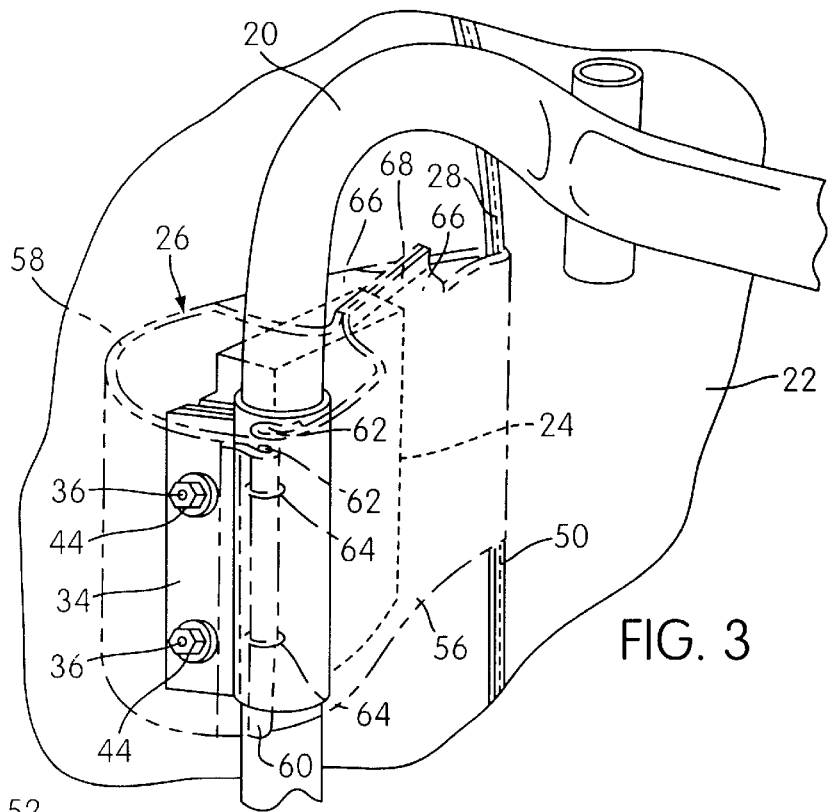
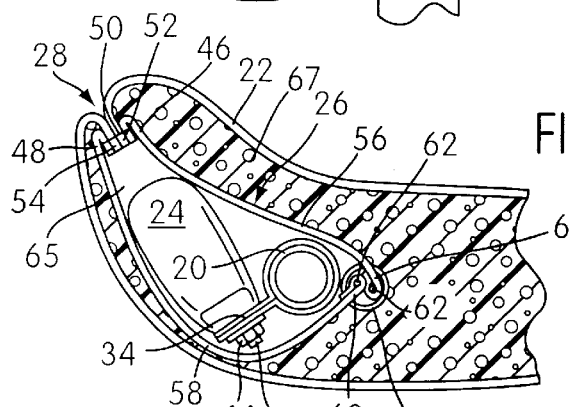
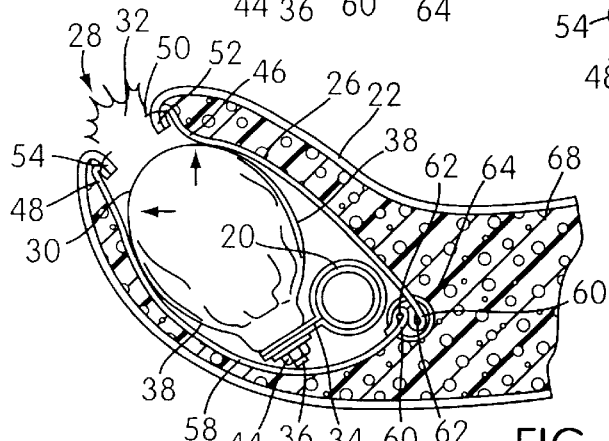
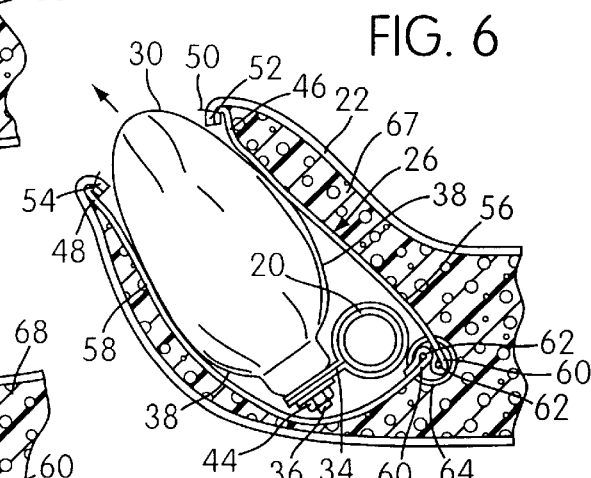
FIG. 3
FIG. 4
FIG. 5
FIG. 6

5,967,546

SIDE AIR BAG DIRECTIONAL GUIDE SYSTEM

This is a continuation in part of U.S. patent application Ser. No. 08/745,743, filed Nov. 12, 1996.

BACKGROUND OF THE INVENTION

1. Field of the Invention

The present invention relates to a vehicle air bag, and more particularly to a side air bag directional guide system.

2. Background and Summary of the Invention

Side air bags have been previously designed to be mounted in a seat of a vehicle and to be deployed through a seam in a vehicle seat cover when a side impact of the vehicle occurs. An example of such a side air bag system is disclosed in U.S. Pat. No. 5,498,030 issued to Hill et al on Mar. 12, 1996. Hill et al discloses an air bag module including an inflater for generating gas and an air bag coupled to the inflater and deployable upon generation of gas by the inflater. The pouch is made of a fabric material and serves as both the housing and cover of the module. The pouch has wall portions surrounding the air bag and inflater and defining a pouch interior containing the inflater and air bag substantially therein such that the inflater and the air bag are housed within the pouch. The pouch is also provided with a frangible seam being breakable to form a pouch deployment opening. Upon air bag deployment, the air bag breaks open the frangible seam of the pouch to permit deployment of the air bag out through the pouched deployment opening. A problem with the design of the Hill et al disclosure is that the air bag will not always deploy through the seam in the trim cover of the vehicle seat as intended. In particular, due to various factors, such as the elasticity of the trim material, the relative strength of the stitched seam and the compressibility of the surrounding underlying foam, the air bag may on occasion rupture the trim at a point other than at the seam, thereby possibly resulting in the bag being improperly deployed. To address this problem, it has been proposed that the stitched seam in the trim material be weakened. However, this can have the undesired effect of reducing the long term durability of the seat trim and result in premature separation or splitting of the seam.

Accordingly, it is an object of the present invention to provide a side air bag directional guide system which reliably directs a deployed air bag through a seam in the vehicle seat. This, and other objects of the present invention, are obtained by providing an air bag directional guide system in a vehicle seat including a seat back having a seat cover with an air bag mounted inside of the seat cover. A membrane is wrapped around the air bag unit and has first and second ends connected to a seam in the seat cover. In the preferred embodiment, first and second ends of the membrane are stitched into the bolster seam in the trim cover when the seam is sewn.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIG. 3 is a detailed perspective view illustrating the side air bag directional guide system according to the principles of the present invention;

FIG. 4 is a sectional view of the side air bag directional guide system according to the principles of the present invention with the air bag unit in an undeployed condition;

FIG. 5 is a similar view to FIG. 4 with the air bag being initially deployed and the air bag intensifier membrane pulling the seam apart;

FIG. 6 is a similar sectional view to FIG. 5 with the seam being broken and the air bag being deployed through the torn seam;

DETAILED DESCRIPTION OF THE PREFERRED EMBODIMENTS

With reference to FIGS. 1–7, the side air bag directional guide system of the present invention will now be described.

Figure 1:
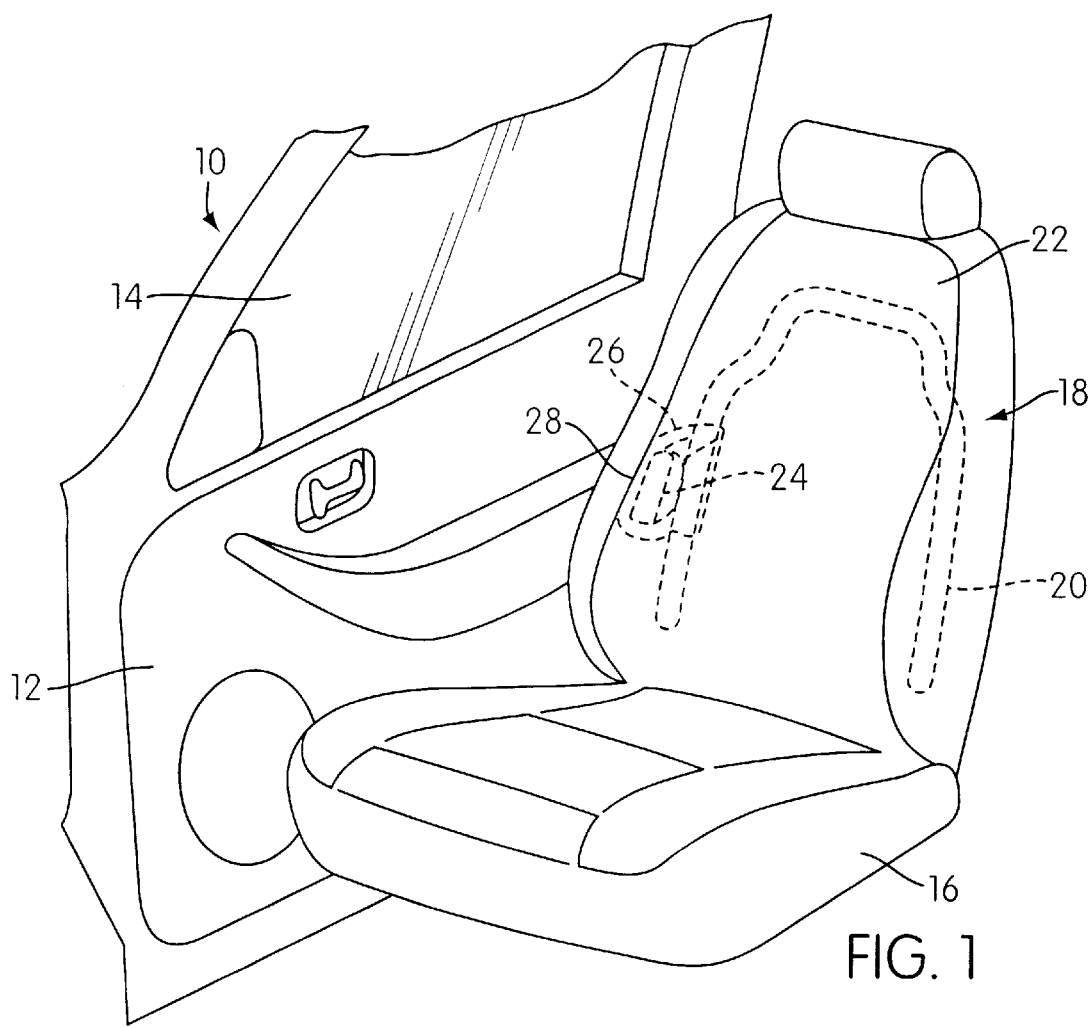
FIG. 1 is a perspective view of a vehicle interior illustrating an air bag unit in an undeployed condition mounted inside of a seat cover according to the principles of the present invention.
Figure 7:
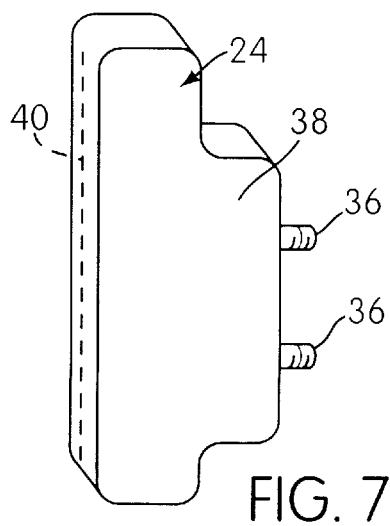
FIG. 7 is an exemplary air bag unit usable with the side air bag directional guide system of the present invention.
Figure 2:
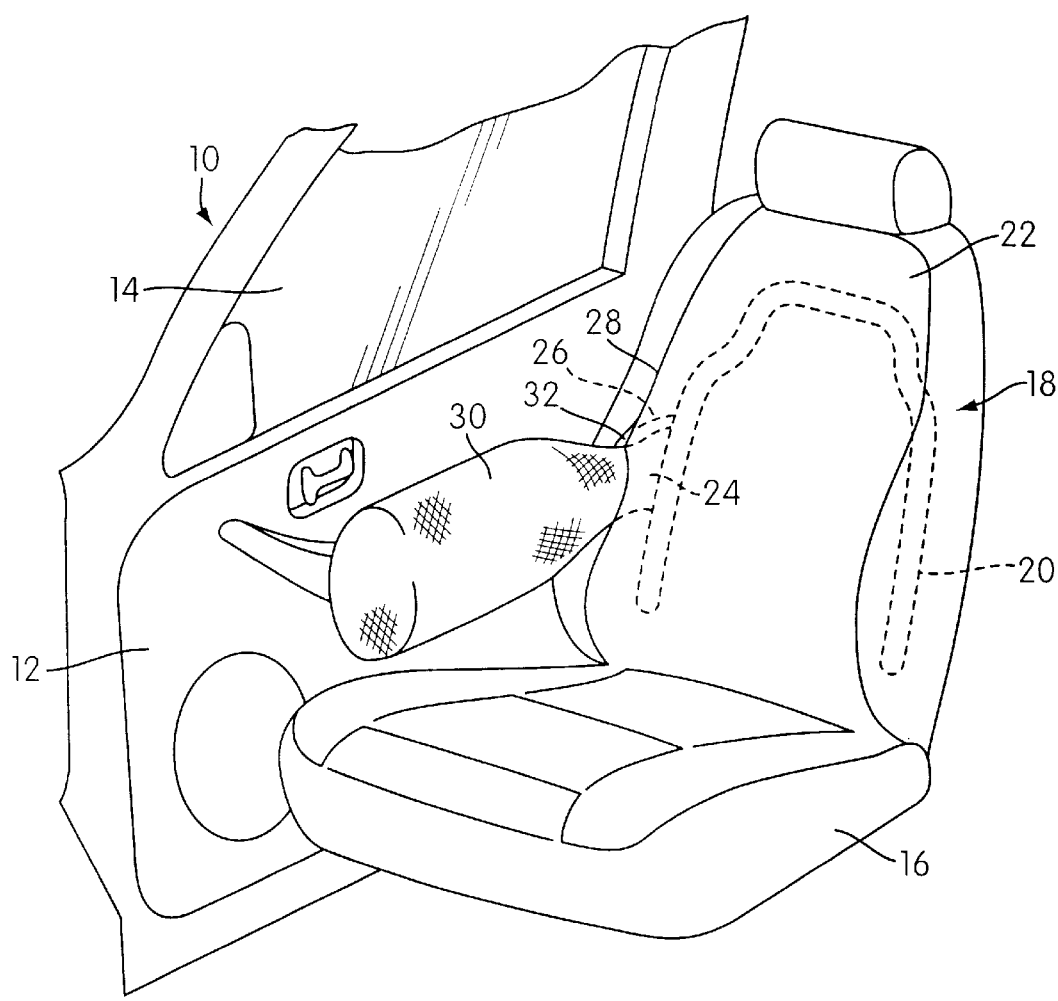
FIG. 2 is a similar perspective view showing the side air bag deployed through a seam in the seat.

Referring to FIG. 1, a vehicle 10 is shown including a door 12 having a movable window 14 mounted thereon. The interior of the vehicle 12 includes a seat 16 having a seat back 18 supported by a seat back frame 20. Seat back 18 is provided with a seat cover 22. An air bag unit 24 is mounted to seat back frame 20 inside the side bolster of seat back 18. In FIG. 1, the air bag unit 24 is illustrated in an undeployed condition. FIG. 2 illustrates the air bag 30 of air bag unit 24 in a deployed position. The air bag 30 is preferably deployed through an opening 32 in bolster seam 28.

Air bag unit 24 is mounted to seat back frame 20 by bracket 34. Air bag unit 24 is provided with a pair of bolts 36 extending from a plastic cover 38 which encloses the air bag 30 and an inflater. The air bag 30 is coupled to the inflater which generates gas upon energization to rapidly fill and deploy the bag 30. Plastic cover 38 is provided with a break line 40 at which the plastic cover 38 opens up upon deployment of the air bag 30.

The bolts 36 of air bag unit 24 are secured to bracket 34 by nuts 44. Bracket 34 is attached to the seat back frame by welding or other means. A fabric intensifier membrane 26 is wrapped around seat back frame 20 and air bag unit 24. The intensifier membrane 26 preferably includes a first and second panel 56, 58. A first end 46 of each panel 56 and 58 is sewn into the bolster seam 28 in the trim cover 22 in a manner to be subsequently described. A sleeve 60 is formed along an edge opposite the first ends 46 of the two panels 56 and 58. A rod 62 is inserted into each of the sleeves 60 and the rods 62 connected to one another such as by a pair of hog rings 64 so that the intensifier membrane 26 completely surrounds the air bag unit 24. Preferably, each panel 56, 58 of intensifier membrane 26 includes an upper and a lower flap portion 66 which are sewn to the corresponding upper and lower flap portions 66 of the opposing panel by thread 68. The upper and lower flap portions 66 substantially enclose the cavity defined by intensifier membrane 26 around the air bag unit 24, thereby ensuring that deployment of the air bag is not diverted upwardly or downwardly instead of bursting through seam 28. Flap members 60 are preferably formed integrally with panels 56, 58. Because the upward and downward forces exerted on the thread stitching 68 securing flap portions 66 is less than the forces exerted on the bolster seam 28, the thread stitching 68 can be formed with the same equipment used to form seam 28 and still ensure proper deployment of the air bag 30.

It is presently the practice during construction of automotive seating for the trim cover to be completely pre-sewn with the bottom end of the cover open so that is can be installed onto the seat back over the foam padding. Typically, this is accomplished by turning the trim cover inside out and then rolling the trim cover from the top closed end down over the foam padding.

Figure 12:
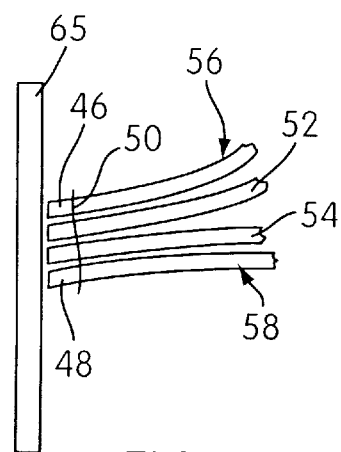
FIG. 12 illustrates how the intensifier membrane is sewn into the bolster seam of the seat back according to a preferred embodiment of the present invention.

To accommodate this assembly technique, the first ends 46 of the two panels 56 and 58 of the intensifier membrane 26 are sewn directly into the bolster seam 28 at the appropriate location along the seam when the trim cover is manufactured. In particular, during the conventional manufacturing process, the respective edges of the front and side panels 52, 54, respectively, of the trim cover are typically butted up against a guide and then run through a sewing machine to stitch the panels together along their respective edges. In the present invention, at this step in the manufacturing process, the first ends 46, 48 of the two panels 56 and 58 of the intensifier membrane 26 are positioned at the appropriate location on either side of the two trim cover panels 52, 54 and butted up against the guide 65 as shown in FIG. 12. The trim panels 52, 54 together with the two intensifier panels 56 and 58 are then run through the sewing machine so that the first ends 46, 48 of the intensifier membrane panels 56 and 58 are stitched into the bolster seam 28 in the trim cover 22. When the trim cover 22 is subsequently installed onto the seat back frame 20, the opposite sleeve ends 60 of the two panels 56 and 58 are fed through the split 66 formed in the foam padding 68 to accommodate the air bag unit 24. The sleeve ends 60 of the two panels 56 and 58 are then joined together around the frame 20 and air bag unit 24 as previously described.

Note that the disclosed manner of securing the intensifier membrane around the air bag unit 24 presumes that the air bag unit 24 is previously installed onto the seat frame bracket 34 prior to assembly of the foam padding 62 and trim cover 22. However, if the air bag unit 24 is installed simultaneously with the installation of the trim cover, the ends 60 of the two panels 56 and 58 can optionally be provided with bolt holes and secured directly to the seat frame bracket 34 with the air bag unit 24. In this manner, it would not be necessary for the intensifier member 26 to pass around the seat frame 20, and the rods 62 and hog rings 64 could be eliminated.

In operation, as the air bag begins to inflate, as shown in FIG. 5, the stresses applied to the intensifier membrane 26 are thus directed at the bolster seam 28, causing the seam 28 to tear open and ensuring that the air bag 30 is properly deployed through the opening 32 in the trim seam. In particular, the intensifier membrane 26 confines the air bag as it inflates so that the force from the inflating air bag is directed at the seam 28 in the trim cover 22. Since the tensile strength of the intensifier membrane 26 is substantially greater than that of the stitched seam 28, the stress from the inflating air bag 30 pulls the seam apart, ensuring that the air bag properly deploys through the seam 28 in the trim cover 22 as illustrated. To accomplish this function, the intensifier membrane 26 must be made from a material that is stitchable, and yet has a high tensile strength with minimum elongation. The intensifier membrane 26 is preferably made from a high strength, low elasticity, woven fabric. Alternatively, other materials can be used such as a high strength, low elasticity plastic material.

Figure 8:
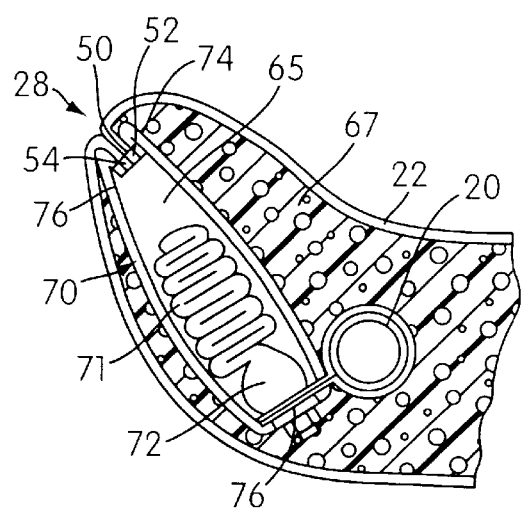
FIG. 8 is a sectional view of a side air bag directional guide system according to a second embodiment of the present invention.

With reference to FIG. 8, a second embodiment of the present invention is illustrated with a membrane 70 serving as both a cover for the air bag unit, including air bag 71 and inflater 72, and as an intensifier membrane. First and second ends 74, 76 of the membrane 70 are attached to the bolster seam 28 of the seat cover 22, while membrane 70 is also attached to bracket 76 which is mounted to frame 20 and supports air bag 71 and inflater 72.

Figure 9:
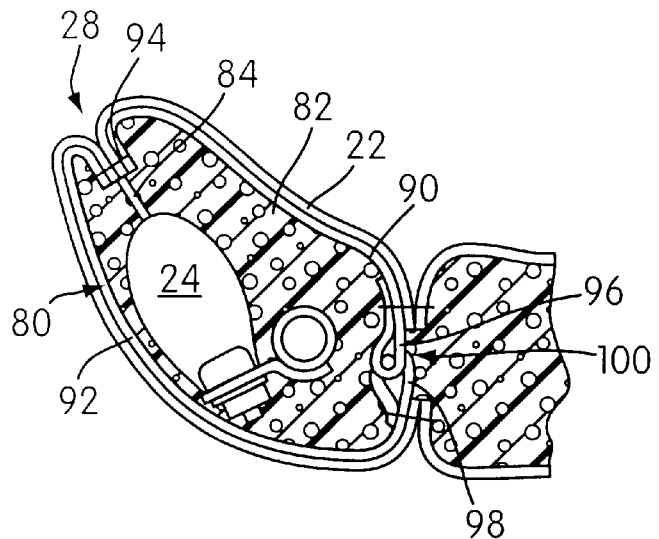
FIG. 9 is a sectional view of a side air bag directional guide system according to a third embodiment of the present invention.
Figure 10:
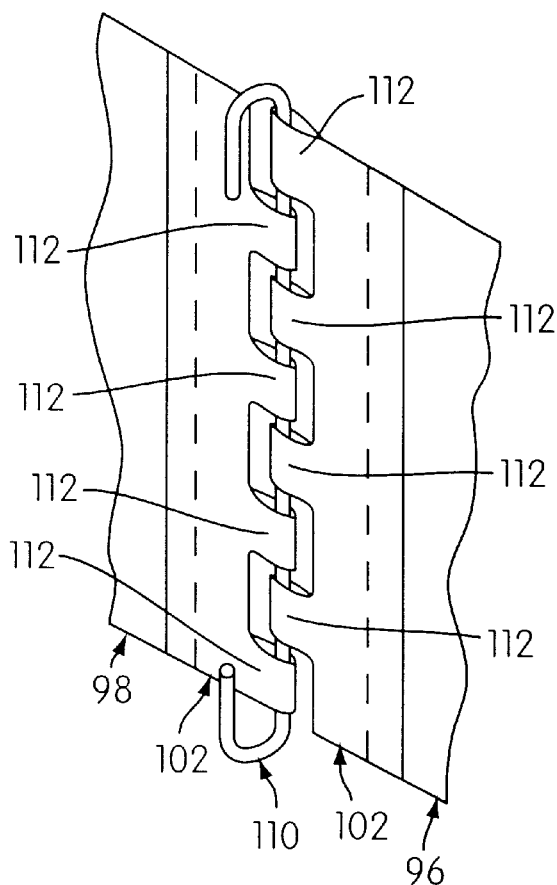
FIG. 10 is a detail view of a single wire sleeve closure for attaching ends of the two panels of an intensifier membrane.
Figure 11:
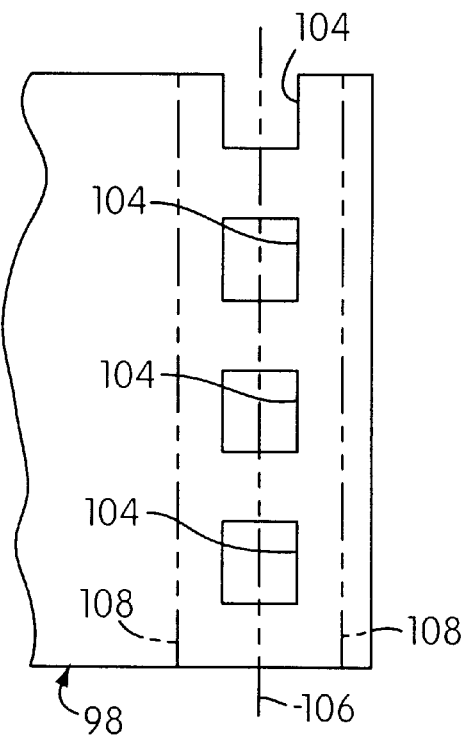
FIG. 11 illustrates the method of forming the notched sleeves shown in FIG. 10.

According to yet another embodiment of the present invention as shown in FIG. 9, an intensifier membrane 80 surrounds the foam padding 82 which is disposed around the air bag unit 24. Foam padding 82 is provided with a deployment split 84 which extends from the air bag unit 24 to the bolster seam 28. Intensifier membrane 80 is disposed adjacent to seat cover 22 and is provided with first and second panels 90, 92 each having a first end sewn in the bolster seam 28 by thread 94. First and second panels 90, 92 each have a second end 96, 98, respectively, which are connected to one another by a single wire sleeve closure 100. Closure 100 includes a pair of corresponding notched sleeves 102 on the second end 96, 98 of each of the first and second panels 90, 92. Notched sleeves 102 are formed by cutting a plurality of rectangular openings 104 along a sleeve fold line 106. The sleeves 102 are created by folding the fabric over along the fold line 106 and sewing the fabric together along sew lines 108. The corresponding notched sleeves 102 of first and second panels 90, 92 are connected together by a wire 110 which is inserted in alternating fashion through adjacent sleeve portions 112.

Figure 13:
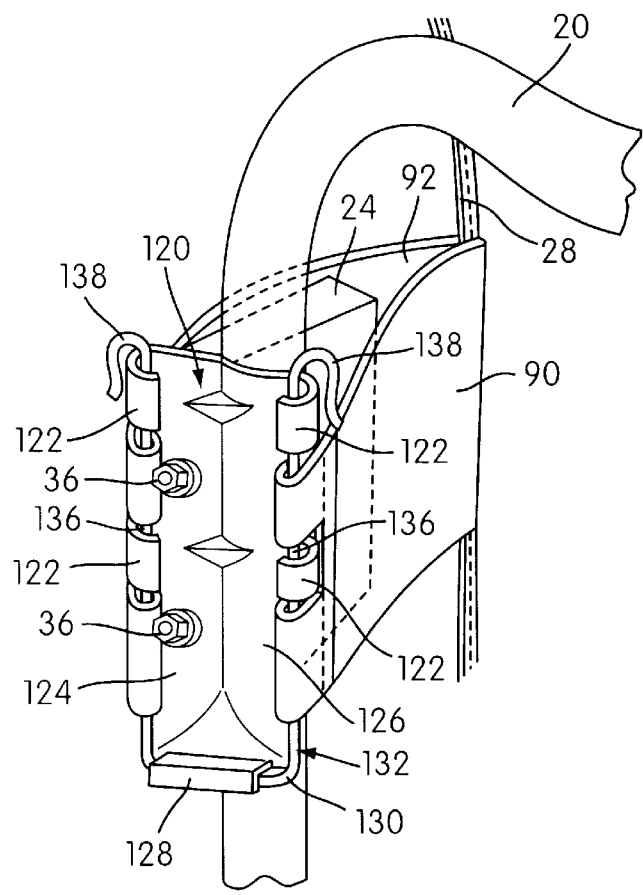
FIG. 13 is a detailed perspective view illustrating the side air bag directional guide system according to a fourth embodiment of the present invention.
Figure 14:
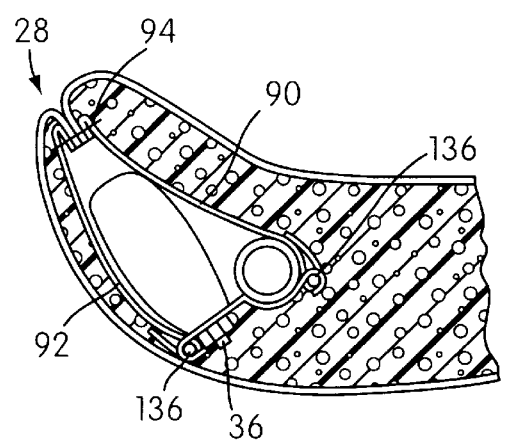
FIG. 14 is a sectional view of the side air bag directional guide system shown in FIG. 13.

Alternatively, the first and second panels 90, 92 can be connected in the manner illustrated in FIGS. 13 and 14. The panels 90, 92 again each have a first end sewn in the bolster seam 28 by thread 94. In addition, the second ends 96, 98 of each of the first and second panels 90, 92 are provided with a notched sleeve 102 formed generally in the manner described above. However, in the embodiment shown in FIGS. 13 and 14, the first and second panels 90, 92 of the intensifier membrane 80 are attached to a support bracket 120. Support bracket 120 includes a pair of inwardly extending clip portions 122 disposed along opposite side edges 124, 126. A tab portion 128 extends from a lower edge 130 of the support bracket 120. The support bracket 120 is mounted to the seat back frame 20. The air bag unit 24 is mounted to the support bracket 120.

Figure 15:
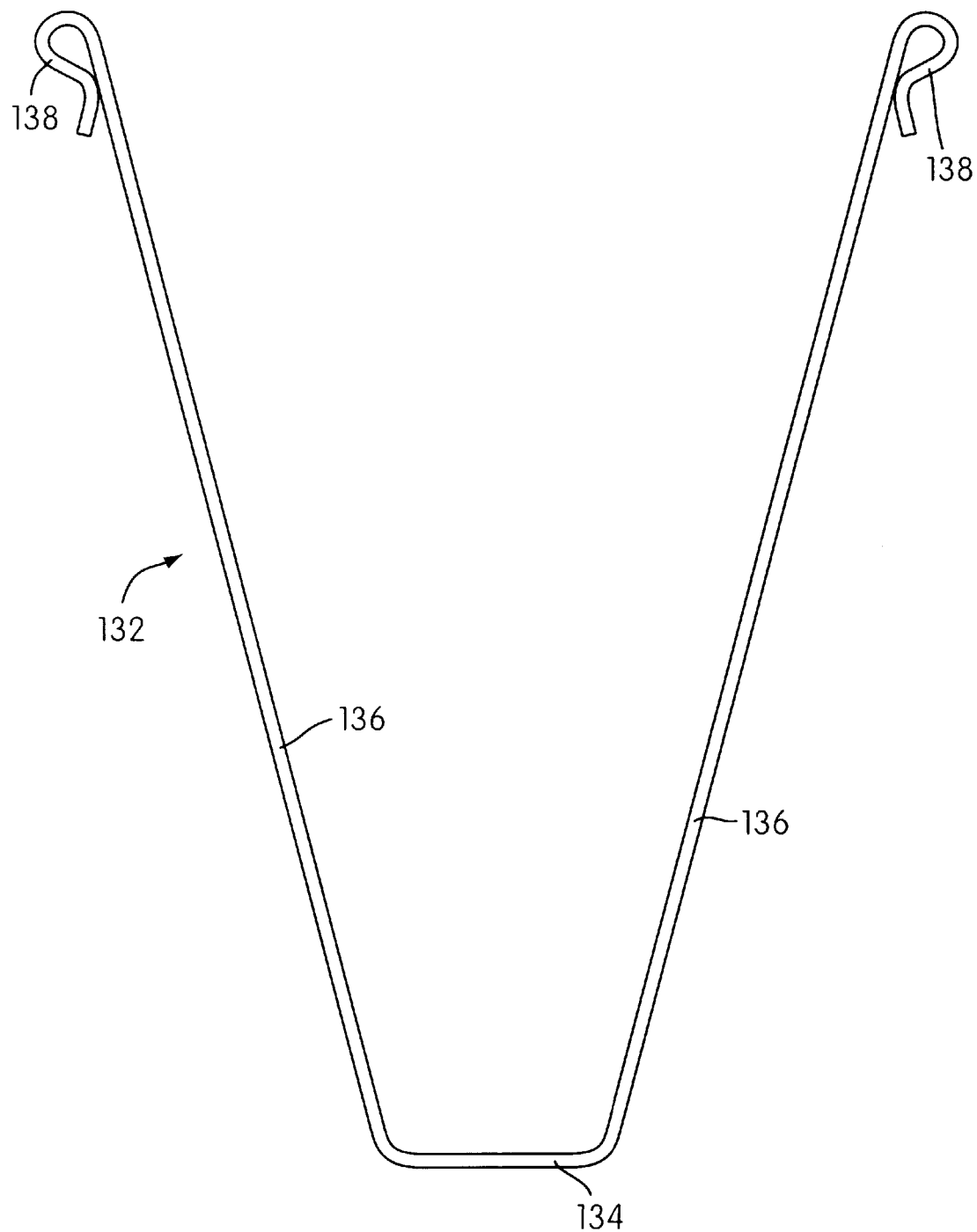
FIG. 15 is a plan view of the generally U-shaped wire utilized with the embodiment shown in FIG. 13.

A generally U-shaped spring retaining wire 132, including a base portion 134 and two leg portions 136 extending from the base portion 134 (see FIG. 15), is inserted in the notched sleeves 102 of the first and second panels 90, 92. Each leg portion 136 is inserted in a corresponding sleeve 102 of the first and second panels 90, 92. The open end of spring retaining wire 132 is forced together and the wire is placed between the clips 122 of support bracket 120, as shown in FIG. 13. The spring force of the wire 132 holds the wire 132 tightly in the clips 122. In addition, the wire 132 is provided with hooks 138 disposed at the ends of the leg portions 136. Hooks 138 prevent retaining wire 132 from sliding down on the clips 122. The retaining wire 132 is further trapped between tab portion 128 and frame 20 to restrain the wire 132 from sliding upward.

In operation, as the air bag begins to inflate, forces are applied to the intensifier membrane 80. Because intensifier membrane 80 is made from a material with high strength and low elasticity, the intensifier membrane 80 causes seam 28 to tear open so that the air bag is deployed through the deployment split 84 in foam padding 82 and through the tear in the seam created by the intensifier membrane 80.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An air bag directional guide system, comprising:
    a vehicle seat including a frame and a seat back having a seat cover;
    a support bracket fixed to said frame;
    an air bag unit mounted inside of said seat cover, said air bag unit including an air bag and an inflator;
    a membrane at least partially around said air bag and said inflator of said air bag unit, said membrane being made separately from said seat cover, said membrane being made of high strength, low elasticity material, whereby upon actuation, said membrane controls and directs deployment of said air bag to ensure that the air bag is properly deployed through the seam;
    said membrane including a first panel having a first end and a second end opposite said first end, and a second panel having a first end and a second end opposite said first end, said first panel first end and said second panel first end connected to a seam in said seat cover, and
    said first and second panels having said second ends thereof secured to said support bracket at laterally spaced locations.

2. The air bag directional guide system according to claim 1, wherein said first panel second end forms a sleeve, and said second panel second end forms a sleeve, and wherein said sleeves are fixed to said support bracket by a wire inserted in said sleeves.

3. The air bag directional guide system according to claim 2, wherein said support bracket is provided with at least one side clip on opposite edges thereof, wherein said wire is generally U-shaped including a base portion and two leg portions extending therefrom, wherein said two leg portions are engaged with said side clips for connecting said first and second panels together.

4. The air bag directional guide system according to claim 3, wherein said wire includes a hook portion on each end.

5. The air bag directional guide system according to claim 3, wherein said support bracket further includes a tab portion along another edge thereof for engaging said base portion of said wire.

6. The air bag directional guide system according to claim 3, wherein said air bag unit is mounted to said support bracket.

7. A method of directing a side air bag mounted in a vehicle seat, comprising the steps of:
    mounting an air bag unit inside of a seat cover of a seat back;
    attaching first and second ends of a membrane to a seam in said seat cover; and
    wrapping said membrane around said air bag unit.

8. The method according to claim 7, wherein said step of attaching includes the step of sewing said seam together with said first and second ends of said membrane attached thereto.

9. The method according to claim 7, wherein said membrane includes a first and second panel which are attached to one another at upper and lower ends thereof.

* * * * *